US012585807B2

(12) United States Patent
Anderson et al.

(10) Patent No.: US 12,585,807 B2
(45) Date of Patent: Mar. 24, 2026

(54) AUTHORIZATION AUDIT FOR ACCESS TO PRIVILEGED USER DATA

(71) Applicant: Hewlett-Packard Development Company, L.P., Spring, TX (US)

(72) Inventors: Paul Michael Anderson, Fort Collins, CO (US); Christopher Myers, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 243 days.

(21) Appl. No.: 18/250,528

(22) PCT Filed: Oct. 28, 2020

(86) PCT No.: PCT/US2020/057803
§ 371 (c)(1),
(2) Date: Apr. 25, 2023

(87) PCT Pub. No.: WO2022/093221
PCT Pub. Date: May 5, 2022

(65) Prior Publication Data
US 2023/0401330 A1      Dec. 14, 2023

(51) Int. Cl.
H04L 29/06          (2006.01)
G06F 21/62          (2013.01)
(52) U.S. Cl.
CPC .................................. G06F 21/6218 (2013.01)
(58) Field of Classification Search
CPC .................................................. G06F 21/6218
See application file for complete search history.

(56) References Cited

U.S. PATENT DOCUMENTS

| | | | |
|---|---|---|---|
| 8,205,092 B2 | 6/2012 | Stokes | |
| 8,250,045 B2 | 8/2012 | Er et al. | |
| 9,118,656 B2 | 8/2015 | Ting et al. | |
| 2008/0289036 A1 | 11/2008 | Kandasamy et al. | |
| 2010/0325727 A1* | 12/2010 | Neystadt ................. | G06F 21/53 726/22 |
| 2013/0304881 A1 | 11/2013 | Venkatraman et al. | |
| 2016/0316367 A1 | 10/2016 | Rose et al. | |
| 2017/0186123 A1* | 6/2017 | Shelton ................ | G06Q 50/265 |
| 2018/0268386 A1 | 9/2018 | Wack et al. | |
| 2019/0342759 A1* | 11/2019 | Mahaffey .............. | H04M 15/58 |
| 2020/0221155 A1* | 7/2020 | Hansen .............. | H04N 21/4131 |

OTHER PUBLICATIONS

"CIS Microsoft Windows Server 2012 R2 Benchmark", Center for Internal Security, vol. 2.2.0, Apr. 28, 2016, pp. 732.

* cited by examiner

*Primary Examiner* — Wasika Nipa
(74) *Attorney, Agent, or Firm* — Quarles & Brady LLP

(57) ABSTRACT

In an example implementation according to aspects of the present disclosure, a system, method, and storage medium comprising a processor, memory, and instructions to send a request for authorization to a user wherein the authorization is limited to a subset of privileged information associated with the user, receive a response for authorization from the user. The instructions, responsive to the receipt of the response, access the subset of privileged information from a user data repository. The instructions, responsive to the access, send an audit record to an audit system, wherein the audit record comprises the request, the response, and a summary of the access and send the audit record to the user.

14 Claims, 5 Drawing Sheets

402   RECEIVE A CONTEXT FROM USER

404   SEND A REQUEST FOR AUTHORIZATION

406   RECEIVE A RESPONSE FOR AUTHORIZATION

408   ACCESS A SUBSET OF PRIVILEGED INFORMATION

410   SEND AN AUDIT RECORD TO AUDIT SYSTEM

412   SEND THE AUDIT RECORD TO USER

AUTHORIZATION AUDIT FOR ACCESS TO PRIVILEGED USER DATA

BACKGROUND

Computing systems may facilitate remote troubleshooting and end user support repair requests. The computing systems utilize databases accessible by agents to identify registered users as well as information relating to the users and their affected devices.

DETAILED DESCRIPTION

A customer support agent may interface with numerous users per hour in a user support call center. Often agents may walk through scripts to resolve a user's problem. In this interaction between user and agent, often personal information relating to the user may be accessed in a user data repository. In some instances, an agent may inadvertently access a field unrelated to the context for the interaction between the user and the agent. In a worst case, an agent may nefariously access privileged information of the user within the user data repository. In instances such as these, the user may not be aware that their privileged information has been compromised. Described herein is a system, method and computer readable medium for authorization audit.

In one example, a system may include a processor and a memory. The memory may be coupled to the processor and stores machine readable instructions. The machine-readable instructions cause the processor to send a request for authorization to a user wherein the authorization is limited to a subset of privileged information associated with the user and receive a response for authorization from the user. The instructions also cause the processor, responsive to the receipt of the response, to access the subset of privileged information from a user data repository, and responsive to the access, send an audit record to an audit system. The audit record comprises the request, the response, and a summary of the access. The instructions then cause the processor to send the audit record to the user.

Figure 1:
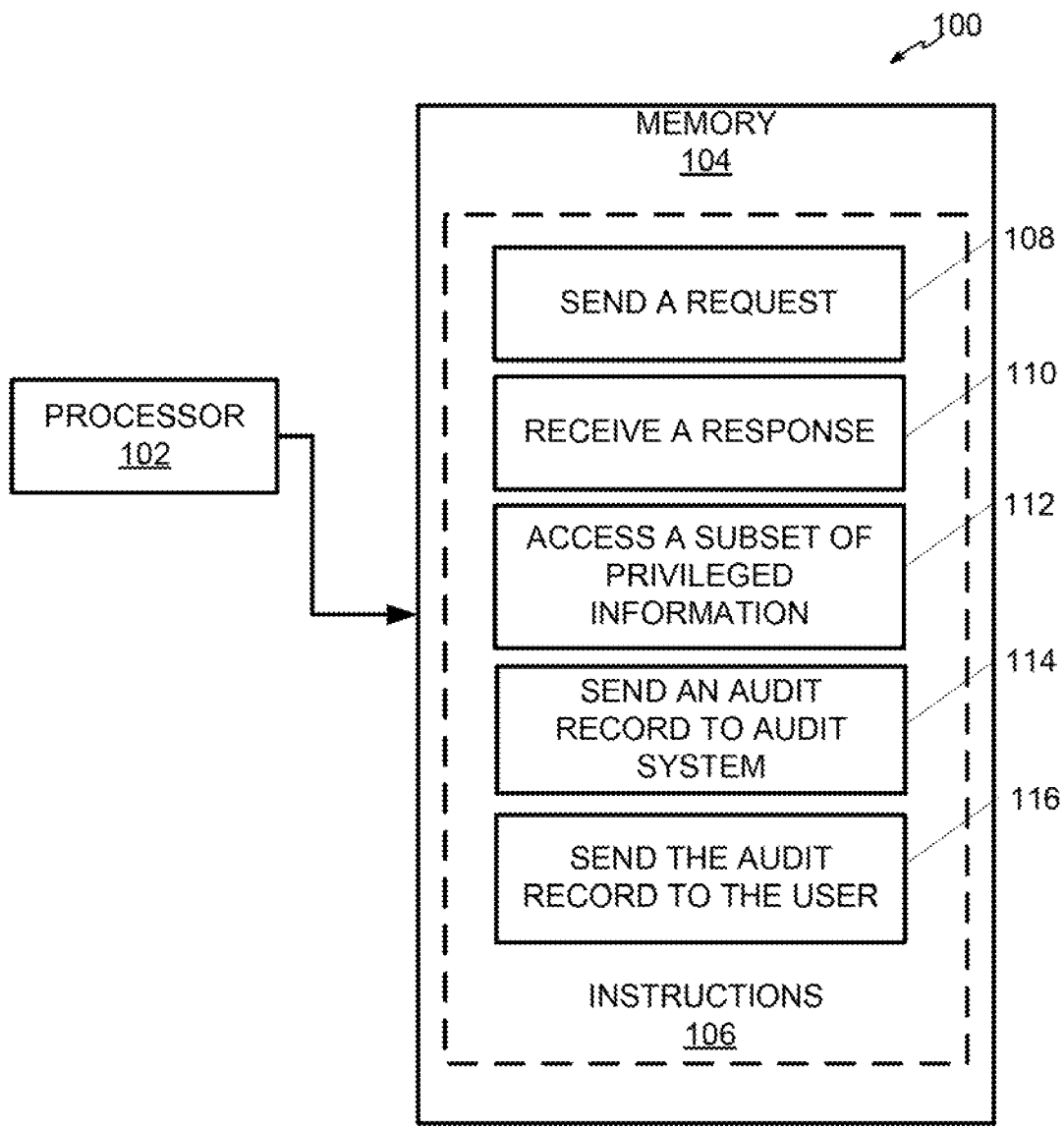
FIG. 1 illustrates a system for authorization audit, according to an example.

FIG. 1 illustrates a system 100 for authorization audit, according to an example. The processor 102 of the system 100 may be implemented as dedicated hardware circuitry or a virtualized logical processor. The dedicated hardware circuitry may be implemented as a central processing unit (CPU). A dedicated hardware CPU may be implemented as a single to many-core general purpose processor. A dedicated hardware CPU may also be implemented as a multi-chip solution, where more than one CPU are linked through a bus and schedule processing tasks across the more than one CPU.

A virtualized logical processor may be implemented across a distributed computing environment. A virtualized logical processor may not have a dedicated piece of hardware supporting it. Instead, the virtualized logical processor may have a pool of resources supporting the task for which it was provisioned. In this implementation, the virtualized logical processor may actually be executed on hardware circuitry; however, the hardware circuitry is not dedicated. The hardware circuitry may be in a shared environment where utilization is time sliced. In some implementations the virtualized logical processor includes a software layer between any executing application and the hardware circuitry to handle any abstraction which also monitors and save the application state. Virtual machines (VMs) may be implementations of virtualized logical processors.

A memory 104 may be implemented in the system 100. The memory 104 may be dedicated hardware circuitry to host instructions for the processor 102 to execute. In another implementation, the memory 104 may be virtualized logical memory. Analogous to the processor 102, dedicated hardware circuitry may be implemented with dynamic random-access memory (DRAM) or other hardware implementations for storing processor instructions. Additionally, the virtualized logical memory may be implemented in a software abstraction which allows the instructions 106 to be executed on a virtualized logical processor, independent of any dedicated hardware implementation.

The system 100 may also include instructions 106. The instructions 106 may be implemented in a platform specific language that the processor 102 may decode and execute. The instructions 106 may be stored in the memory 104 during execution. The instructions 106 may be encoded to perform operations such as sending a request 108, receiving a response 110, accessing a subset of privileged information 112, sending an audit record to an audit system 114, and sending the audit record to the user 116. The instructions 106 may be described in more detail in reference to subsequent figures.

In other implementations, the request may include read or write permissions to the subset of privileged information in the user data repository. Additionally, the instructions may also invalidate the authorization after the context changes or after a predefined amount of time. The subset of privileged information may correspond to an access level of the requestor or may be associated with a context of the request.

Figure 2:
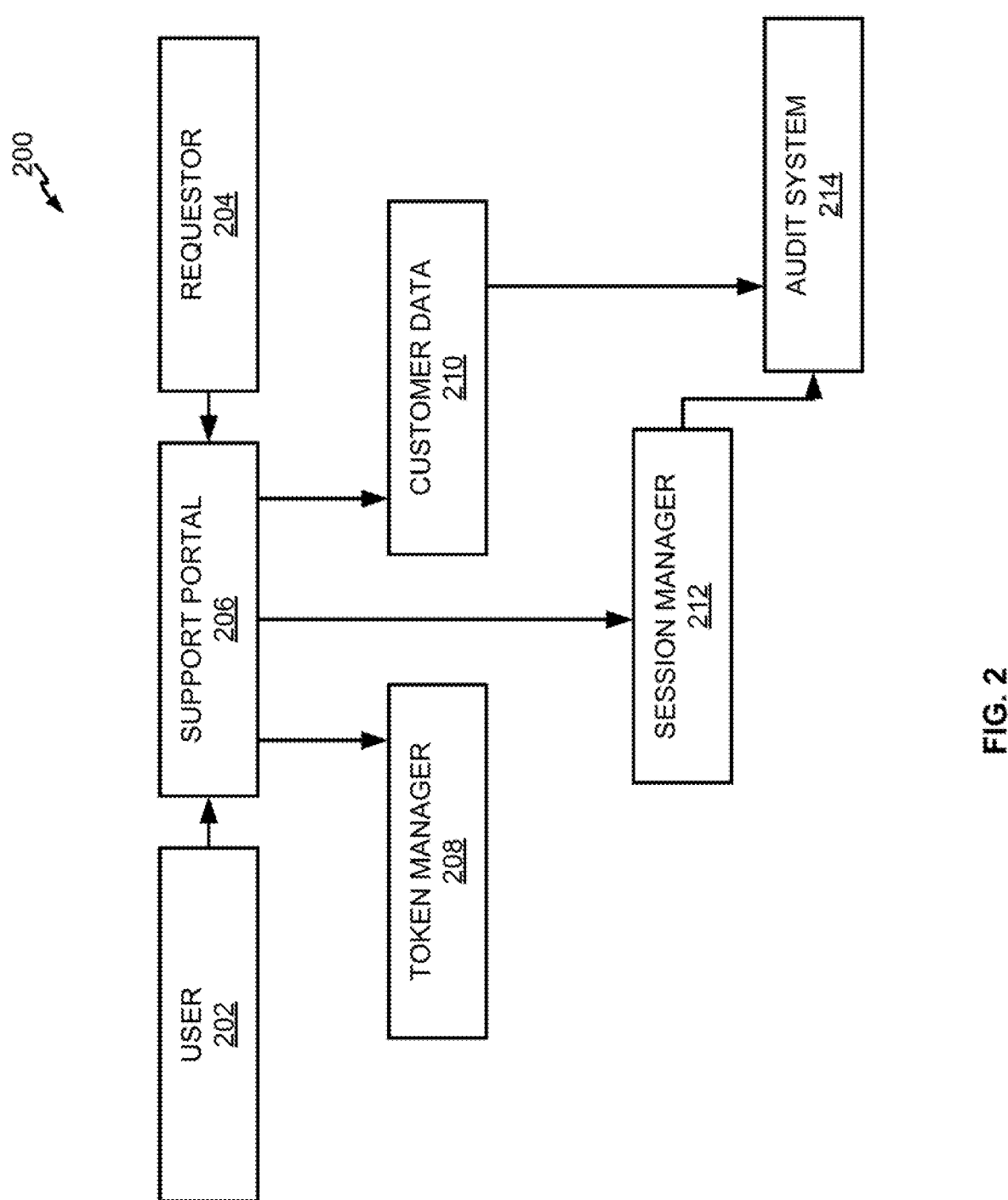
FIG. 2 is a logical block diagram of an authorization audit system, according to an example.

FIG. 2 is a logical block diagram 200 of an authorization audit system, according to an example. The logical block diagram 200 may illustrate logical components in one implementation of the authorization audit system. The components illustrated in the logical block diagram 200 may implement the instructions 106 of the system 100 in FIG. 1. The instructions 106 may be implemented across the logical components in the logical block diagram 200.

A user 202 may initiate an interface into the system. In one implementation, the user 202 may interface the system using electronic communication interface, such as a web-based interface, like a customer chat dialog. In another implementation, the user 202 may interface the system using a telecommunication interface such as a dedicated telephonic customer help line. A user 202 may initiate the interface seeking help in resolving an issue with a product or service. The interfaces (e.g. customer help line, customer chat dialog) may interface a support portal 206. The user 202 may create a context for a session of interaction with the system. The context may be the subject matter for which the user 202 may be interacting with the system. In a customer support implementation, a context may include technical support questions regarding a most recent purchase. In this example, the context may be limited to the questions posed and the subject of the most recent purchase. Additionally, in this example, the context may not include previous support questions, or subjects of historical purchases.

The customer support portal 206 may be a logical system for receiving and dispatching customer support issues. The customer support portal 206 may be tied into a system for receiving a user's 202 call on a customer help line or fielding a customer chat request. The customer support portal 206 may include a database corresponding to contacts from any user 202. The customer support portal 206 may provide authentication and authorization for a user 202 and support agents. In many implementations the customer support portal 206 may be the front end to the entire customer support system.

A support agent may field a user's 202 customer support issue through the customer support portal 206. For purposes of this disclosure the support agent may be referred to as a requestor 204 as it more accurately describes the scope of the customer support agent's role in regard to this disclosure. In a real-world implementation, the requestor 204 and the customer support agent may be synonymous. The requestor 204 may request authorization from a user 202 to access a subset of privileged information from the user 202 in order to support the interaction and solve the user's 202 problem. The requestor 204 may utilize the support portal 206 to facilitate a sending a request for authentication. The requestor 204 initiate sending a request for authentication within the current context that the user 202 introduced in interacting with the system.

In one implementation, the requestor 204 may have an associated digital signature that is unique to the requestor 204. The requestor 204 may present the digital signature via the support portal 206 to verify the requestor to the user 202. The support portal 206 may receive a response for authorization from the user 202 indicating that the user authorizes the requestor 204 to access the subset of privileged information. The support portal 206 may be communicatively coupled to a token manager 208.

The token manager 208 may generate a first token for the user 202 and a second token for the requestor's 204 access. In one implementation, the token manager 208 may be implemented as an authorization server utilizing the OAuth2 specification. The first token and second token may be used to allow the requestor 204 to authenticate with the customer data 210 system. The combination of the first token and the second token define the fields that may be accessed by the requestor 204. The customer data 210 system may act as a protected resource, whereby the token manager 208 provides authentication credentials by way of the first and second tokens.

The customer data 210 may incorporate a system or systems that digitally contain and control access to customer data. For simplicity, the customer data 210 is represented as the data itself. In one implementation, the customer data 210 may be stored in a controlled access database. In another implementation, the customer data 210 may be stored across a distributed system where multiple disparate databases include pieces of a customer's data. The customer data 210 may be coupled to the token manager 208 as a resource server within an OAuth2 implementation. The customer data 210 system may push every access or request for customer data to an audit system 214. The customer data 210 may push the data accessed as well as both tokens required to access the customer data 210.

A session manager 212 logs the first token, the second token, and the context as a session. The session manager 212 may create a session identifier, that corresponds to an interaction between the user 202 and the requestor 204. The session manager 212 stores all tokens generated in an interaction between the user 202 and the requestor 204. For example, the user 202 and the requestor 204 interact and a first token and a second token are generated. In another implementation only token identifiers for all the tokens are stored by the session manager 212. Token identifiers may map to the tokens, while obfuscating the tokens for security purposes. The session manger 212 creates a record for the session with a session identifier as a unique identifier. In the same example, the context of the interaction between the user 202 and the requestor 204 changes. A third and fourth token may be generated. The session manager 212 may add the third and fourth token to the session created previously. As such the session manager 212 may create a session record indicating the tokens generated during the interaction.

An audit system 214 brings the session and the customer data 210 access together. The audit system 214 merges the session captured by the session manager 212 with the data access and the tokens used for data access into a common record. The audit system 214 may receive from the customer data 210 system a first and a second token and accessed data. The accessed data may pertain to a subset of privileged information corresponding to the user 202. The accessed data may not be the data itself but may be a description of the data. For example, the accessed data as reported to the audit system 214 may be identified as a "field" (e.g. name) and not a "value" (e.g. "John Smith"). The first and second tokens may indicate whether the data access in the customer data 210 was a read-only operation or a write operation. Because of the nature of the tokens, the access type (e.g. read-only, write) may be inherent and stored in within the audit system 214 with additional explicit verbosity as to the access type.

Upon completion of a session, the audit system 214 may send a transcript of the session to the user 202. The transcript may include a verbose prose description of the customer data 210 accessed, and the type of access incurred. The transcript may be sent to the user 202 by an electronic messaging system such as email.

Figure 3:
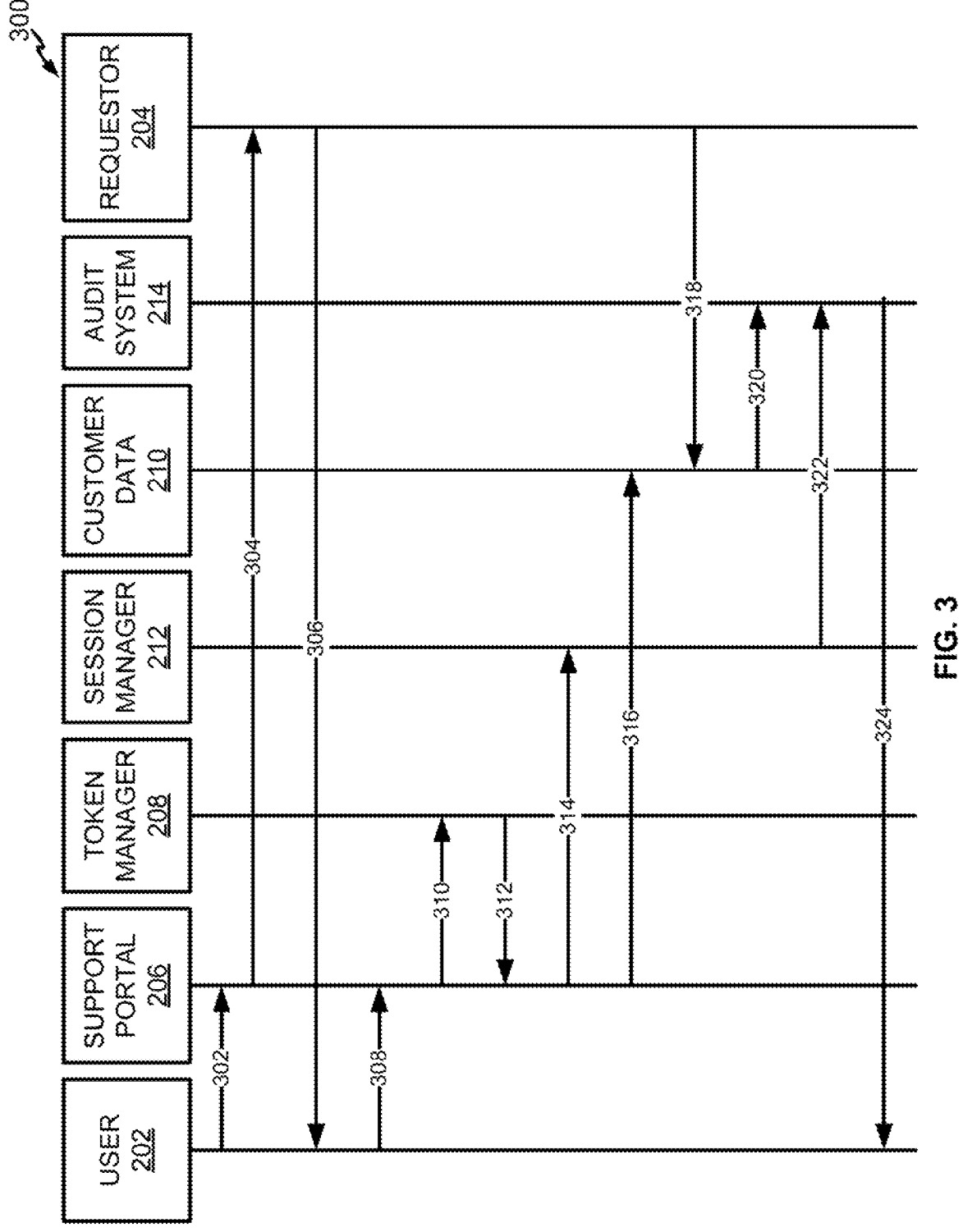
FIG. 3 is an activity diagram showing interactions within an authorization audit system according to an example.

FIG. 3 is an activity diagram 300 showing interactions within an authorization audit system according to an example. The actors within the activity diagram 300 correspond to logical components of one implementation illustrated in FIG. 2. The activity diagram 300 demonstrates the interaction flow between the logical components within the system 200 according to one implementation.

The activity diagram 300 beings with an interaction 302 between the user 202 and the support portal 206. As described previously, the interaction 302 may be telephonic or electronic through an application or web browser.

The support portal 206 allocates 304 a requestor 204. As discussed previously, the requestor 204 may correspond to a customer support agent requesting authorization from a user 202 to participate in the user's interaction 302.

The requestor 204 sends an authorization request 306 to the user 202. The authorization request 306 may include a digital signature that indicates to the user 202 that the requestor 204 genuine.

The user 202 may accept 308 the authorization request. The acceptance may be received at the support portal 206. Upon receipt of the authorization request, the support portal 206 may request 310 tokens from the token manager 208. As discussed previously, a first token may correspond to a user's context, and a second token may correspond to the requestor's authorization. The token manager may transmit a response 312 back to the support portal 206 including the tokens.

The support portal 206 may notify 314 the session manager 212 to create a session corresponding to the user's 202 interaction. The session may include an identifier unique to the session, as well as any of tokens generated during the session. Likewise, the support portal 206 may notify 316 the customer data 210 of authorization. The notification may include any generated tokens as to indicate the type and level of access the requestor 204 has in the customer data 210.

Requestor 204 accesses 318 the customer data 210. The requestor 204 may access the customer data 210. The customer data 210 only allows the requestor 204 to access the data indicated by the context and scope of the token generated. The access may be read-only, or the access may include write permissions based on the tokens.

The customer data 210 logs 320 any accesses, either read or write to the audit system 214. The session manager 212 also logs 322 the stored session to the audit system 214. The audit system 214 correlates the access and the session data based on the tokens present in each. The audit system 214 may build a time-based audit record of the customer data 210 access. The audit system 214 may send 324 the audit record to the user 202. The record may be delivered to the user 202 in the form of an emailed transcript.

Figure 4:
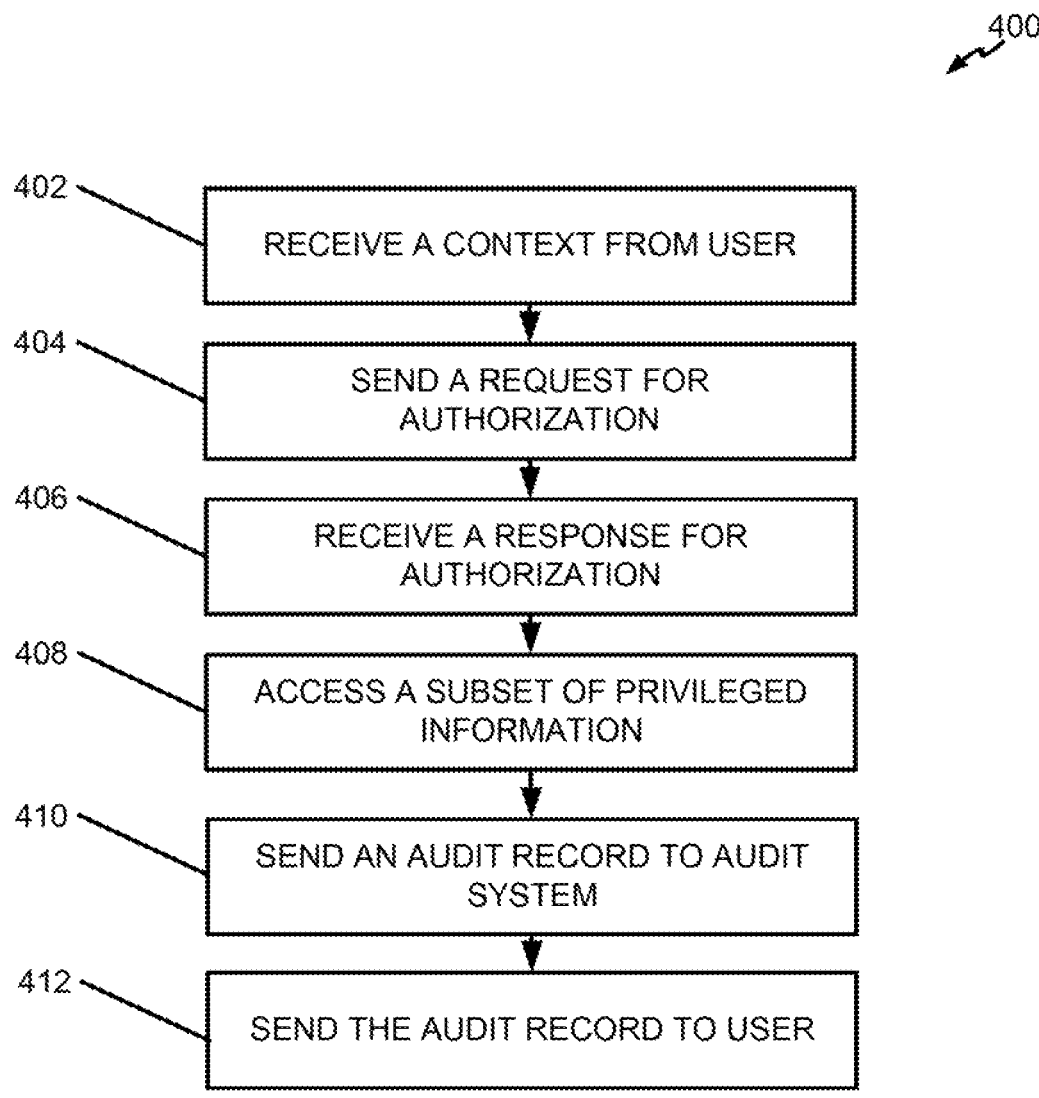
FIG. 4 is a flow diagram of authorization audit, according to an example.

FIG. 4 is a flow diagram 400 of authorization audit, according to an example. References may be made to components of the system 100 of FIG. 1 to more accurately describe the flow of the authorization audit. Additionally, references to logical components of FIG. 3 may be included for clarity.

The processor 102, receives a context from a user at block 402. The context includes a request for assistance. The context may include information only relevant to providing the requested assistance. The context determines the scope of the interaction between the user and the authorization audit system. In some implementations involving context coming from text messaging, the context may be extracted via a natural language processing (NLP) application.

The processor 102 sends a request for authorization to a user at block 404. In some implementations, the authorization is limited to a subset of privileged information associated with the user within the context. For example, if an NLP application determines a context around updating the user's email address, the subset of privilege information may correspond to read/write operations on the user's email address within the customer data. In another implementation, the request authorization includes a digital signature of the requestor. The digital signature allows the user to verify that the requestor's request for authorization is genuine.

The processor 102 receives a response for authorization from the user at block 406. The user provides a response indicating acceptance of the request for authorization. The response may be processed at a support portal 206. The support portal 206 may interface with the token manager 208 to generate the aforementioned first and second tokens. The tokens inherently indicate the subset of privileged information the requestor may access as well as the type of access.

The processor 102 accesses the subset of privileged information from a user data repository at block 408. The processor 102 interfaces with the customer data 210 utilizing the first and second tokens. The processor 102 may query the customer data 210, and return the requested information, or make the requested change to and for the requestor.

The processor 102, sends an audit record to an audit system 214 at block 410. As described previously, the customer data 210 provides the tokens as well as the type and data accessed within the customer data. The audit system 214 creates a record of the transaction. The processor 102 may provide the audit system 214 with a session record as well, that may be correlated to the accessed data and the type of access by the tokens present in the audit record. The audit record may include the request, the response and a summary of access.

The processor 102 sends the audit record to the user at block 412. The processor 102 may provide the audit record to the user in a more verbose human readable format. The audit record may provide a transcript of the interaction with the requestor 204 as well as a record of authorization receive and approve, and data accessed within the customer data 210.

In another implementation, the processor 102 may receive a second context from the user. The second context may include an additional request for assistance. However, the second context may vary from the previous context. For example, the previous context included updating an email address in the customer data 210. The second context may include placing an order for a replacement part.

Upon the detection of the second context, the processor 102 may invalidate the authentication. As the scope of the interaction has changed, the authentication must change as well. The processor 102 may notify the token manager 208 of the invalidated authentication.

The processor 102 may send a second request for second authorization to the user 202. The second authorization may be limited to a second subset of privileged information associated with the user within the second context.

The processor 102 may receive a second response for the second authorization. As with the first request for authentication, the second request may prompt a second response for subsequent authorization to address the change in context or scope of the interaction.

In another implementation, the processor 102 may invalidate the authorization after a predefined amount of time. A timeout feature of the interaction may be implemented into the support portal 206 restrict any customer data 210 access after a period of inactivity. In this instance, after authorization has been invalidated, the requestor 204 may request authorization again.

Figure 5:
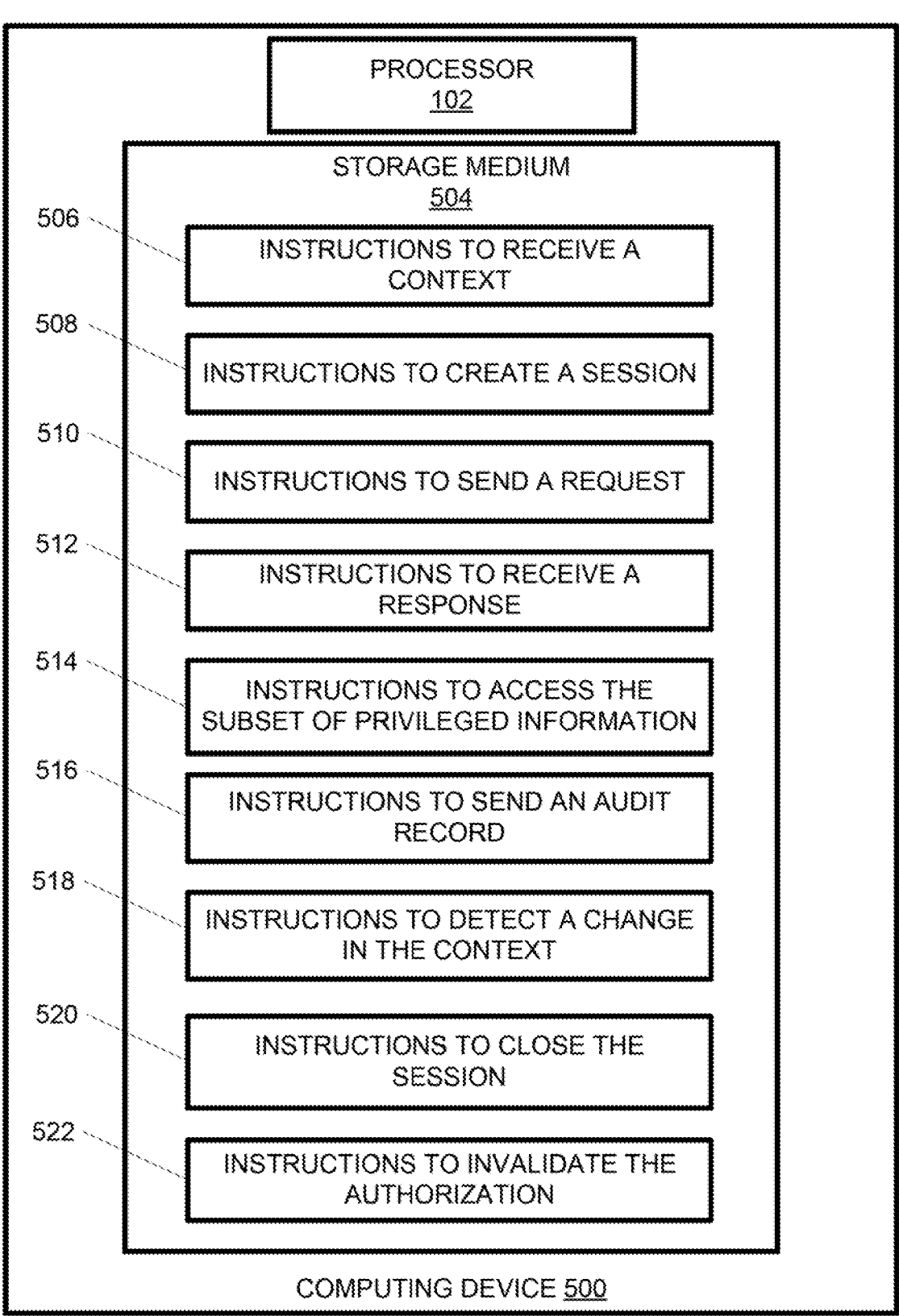
FIG. 5 is a computing device for supporting instructions for an authorization audit, according to an example.

FIG. 5 is a computing device 500 for supporting instructions for an authorization audit, according to an example. The computing device 500 depicts a processor 102 and a storage medium 504 and, as an example of the computing device 500 performing its operations, the storage medium 504 may include instructions 506-522 that are executable by the processor 102. The processor 102 may be synonymous with the processor 102 referenced in FIG. 1. Additionally, the processor 102 may include but is not limited to central processing units (CPUs). The storage medium 504 can be said to store program instructions that, when executed by processor 102, implement the components of the computing device 500.

The executable program instructions stored in the storage medium 504 include, as an example, instructions to receive a context from a user 506, instructions to create a session corresponding to the context 508, instructions to send a request for authorization to the user wherein the authorization is limited to a subset of privileged information associated with the user within the session 510, instructions to receive a response for authorization from the user 512, instructions to access the subset of privileged information from a user data repository responsive to the receipt of the response 514, instructions to send an audit record to an audit system, wherein the audit record comprises the request, the response, and a summary of the access 516, instructions to detect a change in the context 518, instructions to close the session responsive to detecting the change 520, and instructions to invalidated the authorization 522.

Storage medium 504 represents generally any number of memory components capable of storing instructions that can be executed by processor 102. Storage medium 504 is non-transitory in the sense that it does not encompass a transitory signal but instead is made up of at least one memory component configured to store the relevant instructions. As a result, the storage medium 504 may be a non-transitory computer-readable storage medium. Storage medium 504 may be implemented in a single device or distributed across devices. Likewise, processor 102 represents any number of processors capable of executing instructions stored by storage medium 504. Processor 102 may be integrated in a single device or distributed across devices. Further, storage medium 504 may be fully or partially integrated in the same device as processor 102, or it may be separate but accessible to that computing device 500 and the processor 102.

In one example, the program instructions 506-522 may be part of an installation package that, when installed, can be executed by processor 102 to implement the components of the computing device 500. In this case, storage medium 504 may be a portable medium such as a CD, DVD, or flash drive, or a memory maintained by a server from which the installation package can be downloaded and installed. In another example, the program instructions may be part of an application or applications already installed. Here, storage medium 504 can include integrated memory such as a hard drive, solid state drive, or the like.

It is appreciated that examples described may include various components and features. It is also appreciated that numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the scope of the disclosure. Thus, the present disclosure is not intended to be limited to the examples shown herein but is to be accorded the widest scope consistent with the principles and novel features disclosed herein.

What is claimed is:

1. A system comprising:
a processor; and
a memory communicatively coupled to the processor and storing machine readable instructions that when executed cause the processor to:
send a request for authorization to a user from a requestor, wherein the authorization is limited to a subset of privileged information corresponding to the user and wherein the request includes a digital signature that indicates that the requestor is genuine;
responsive to sending the request to the user, receive a response for authorization from the user, the response indicating whether the request is accepted;
responsive to the receipt of the response from the user and the response indicating that the request is accepted:
send a notification to a user data repository, the notification indicating that the authorization is granted by the user, and
permit the requestor to access the subset of privileged information from the user data repository;
responsive to the requestor accessing the subset of privileged information from the user data repository, send an audit record to an audit system, wherein the audit record comprises the request, the response, and a summary of the access;
close the session after a predefined amount of time;
invalidate the authorization; and
upon completion of a session between the requestor and the user, send the audit record to the user.

2. The system of claim 1 wherein the subset of privileged information corresponds to an access level of the requestor.

3. The system of claim 1 wherein the subset of privileged information corresponds to a context associated with the request.

4. The system of claim 3, the instructions when executed further cause the processor to invalidate the authorization after the context changes.

5. The system of claim 1 wherein the request comprises read or write permissions to the subset of privileged information in the user data repository.

6. The system of claim 1, the instructions when executed further cause the processor to receive a context from the user and initiate the session based on the context.

7. A method comprising:
receiving a context from a user;
sending a request for authorization from a requestor to a user wherein the authorization is limited to a subset of privileged information corresponding to the user within the context and wherein the request includes a digital signature that indicates that the requestor is genuine;
responsive to sending the request to the user, receiving a response for authorization from the user, the response indicating whether the request is accepted;
responsive to the receipt of the response from the user and the response indicating that the request is accepted:
sending a notification to a user data repository, the notification indicating that the authorization is granted by the user, and
permitting the requestor to access the subset of privileged information from the user data repository;
responsive to the requestor accessing the subset of privileged information from the user data repository, sending an audit record to an audit system, wherein the audit record comprises the request, the response, and a summary of the access;
closing the session after a predefined amount of time;
invalidating the authorization; and
upon completion of a session between the requestor and the user, sending the audit record to the user.

8. The method of claim 7 further comprising:
receiving a second context from the user;
responsive to receiving the second context, invalidating the authentication;

sending a second request for a second authorization to the user wherein the authorization is limited to a second subset of privileged information associated with the user within the second context; and receiving a second response for the second authorization from the user.

9. The method of claim 7 wherein the request comprises read or write permissions to the subset of privileged information in the user data repository.

10. The system of claim 7 wherein the session corresponds to a customer service interaction.

11. A non-transitory computer readable medium comprising machine readable instructions that when executed cause a processor to:

receive a context from a user;

create a session corresponding to the context;

send a request for authorization from a requestor to the user wherein the authorization is limited to a subset of privileged information corresponding to the user within the session and wherein the request includes a digital signature that indicates that the requestor is genuine;

responsive to sending the request to the user, receive a response for authorization from the user the response indicating whether the request is accepted;

responsive to the receipt of the response from the user and the response indicating that the request is accepted:

send a notification to a user data repository, the notification indicating that the authorization is granted by the user, permit the requestor to access the subset of privileged information from the user data repository;

responsive to the requestor accessing the subset of privileged information from the user data repository, send an audit record to an audit system, wherein the audit record comprises the request, the response, and a summary of the access;

detect a change in the context;

responsive to detecting the change or after a predefined amount of time, close the session;

invalidate the authorization; and upon completion of the session, send the audit record to the user.

12. The medium of claim 11 wherein the request comprises read or write permissions to the subset of privileged information in the user data repository.

13. The medium of claim 11 wherein the user data repository comprises a customer service database.

14. The medium of claim 11 the instructions that when executed further cause the processor to:

receive a second context from the user;

create a second session corresponding to the second context;

responsive to creating the second session, close the session; and invalidate the authorization.

* * * * *